United States Patent
Knox

[15] 3,662,219
[45] May 9, 1972

[54] APPARATUS FOR AUTOMATIC RELAY SYSTEM TESTING

[72] Inventor: Marion D. Knox, 2409 N.W. 115 Place, Oklahoma City, Okla. 73120

[22] Filed: Mar. 16, 1970

[21] Appl. No.: 19,869

[52] U.S. Cl. ..........................317/28 R, 324/73, 340/146.1, 340/309.1, 340/319
[51] Int. Cl. .....................................G01r 15/12, G08b 1/08
[58] Field of Search ................340/146.1, 309.6, 309.1, 318, 340/319; 324/73; 317/28, 29

[56] References Cited

UNITED STATES PATENTS 3,414,773  12/1968  Knox ........................................317/28

Primary Examiner—J. D. Miller
Assistant Examiner—Harvey Fendelman
Attorney—Dunlap, Laney, Hessin & Dougherty

[57] ABSTRACT

Apparatus for enabling check out and functional testing of directional comparison relaying circuitry in combination with transfer trip relaying circuitry having one or more channels in one or more directions, as may be located at one or more positions. The apparatus consists of periodically actuatable test units which provide a plurality of programmed outputs to effect transmission and reception tests of transfer trip channels as well as the proper operation and function of associated directional comparison relaying equipment. A master testing unit located at a first position initiates operation and functions with one or more slaved remote test units to key transmissions and verify received signals between all directional comparison channels. Thereafter, the test units block the respective receiver trip output if necessary, to verify that a guard signal is present and then it returns the indication over the directional comparison relaying equipment to the transfer-trip transmitter location, to command trip signals which are then verified for each channel.

14 Claims, 6 Drawing Figures

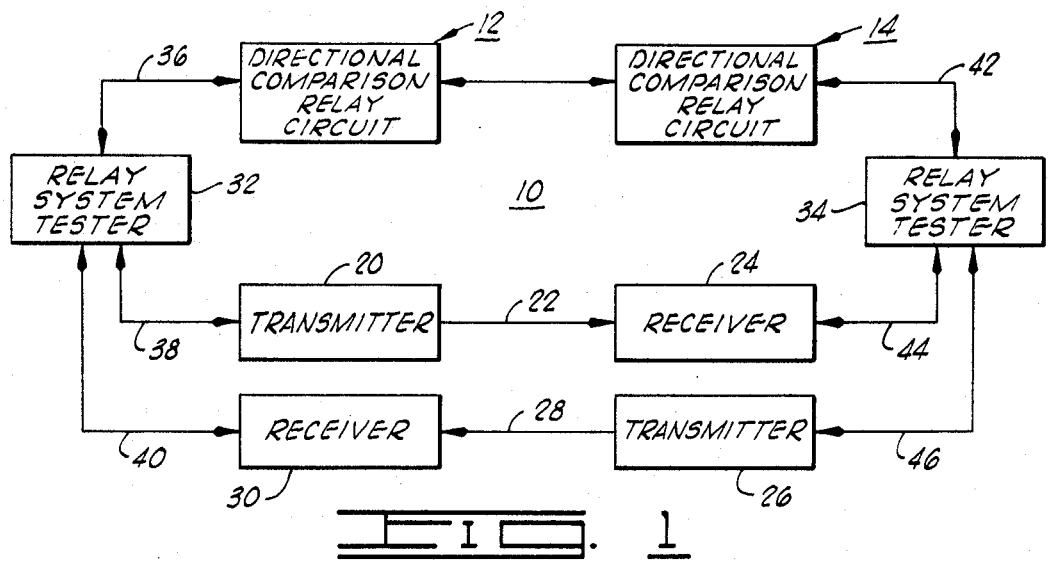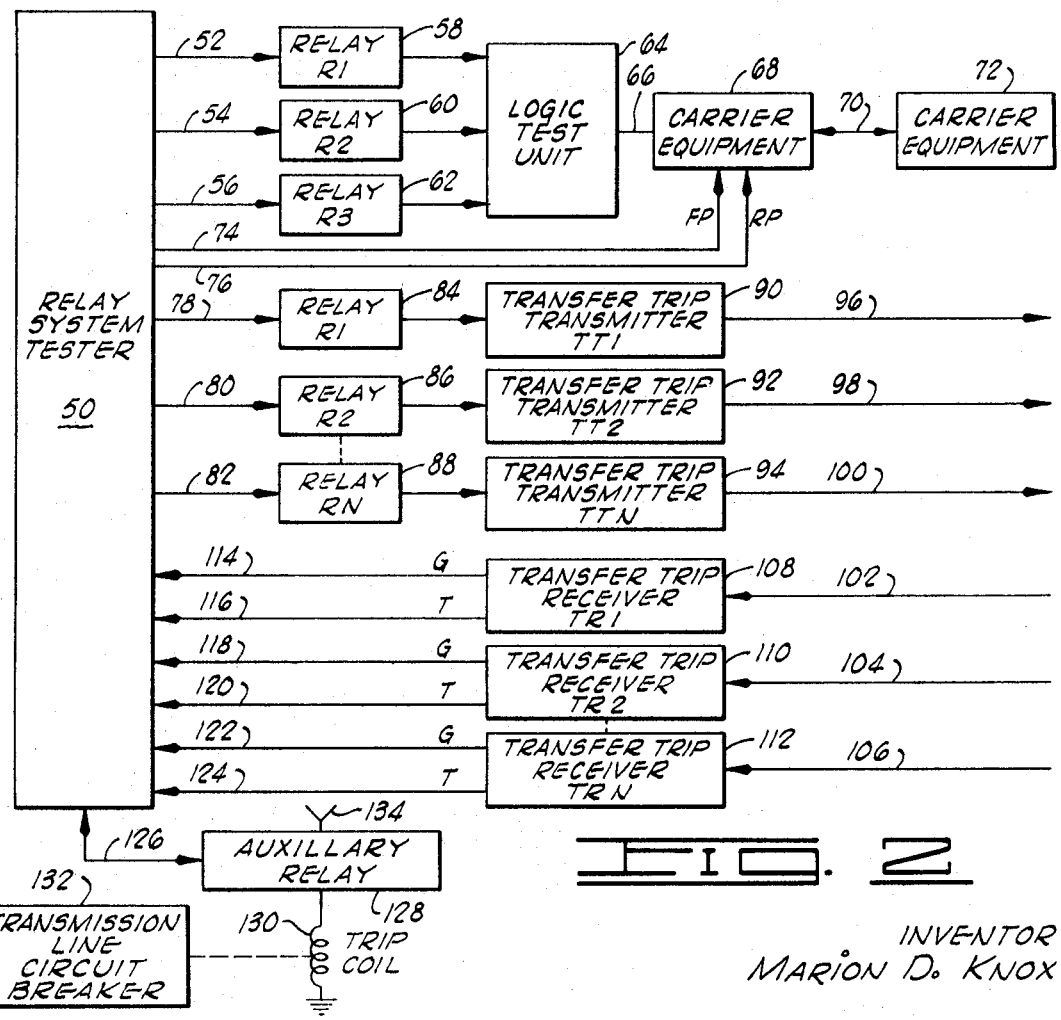

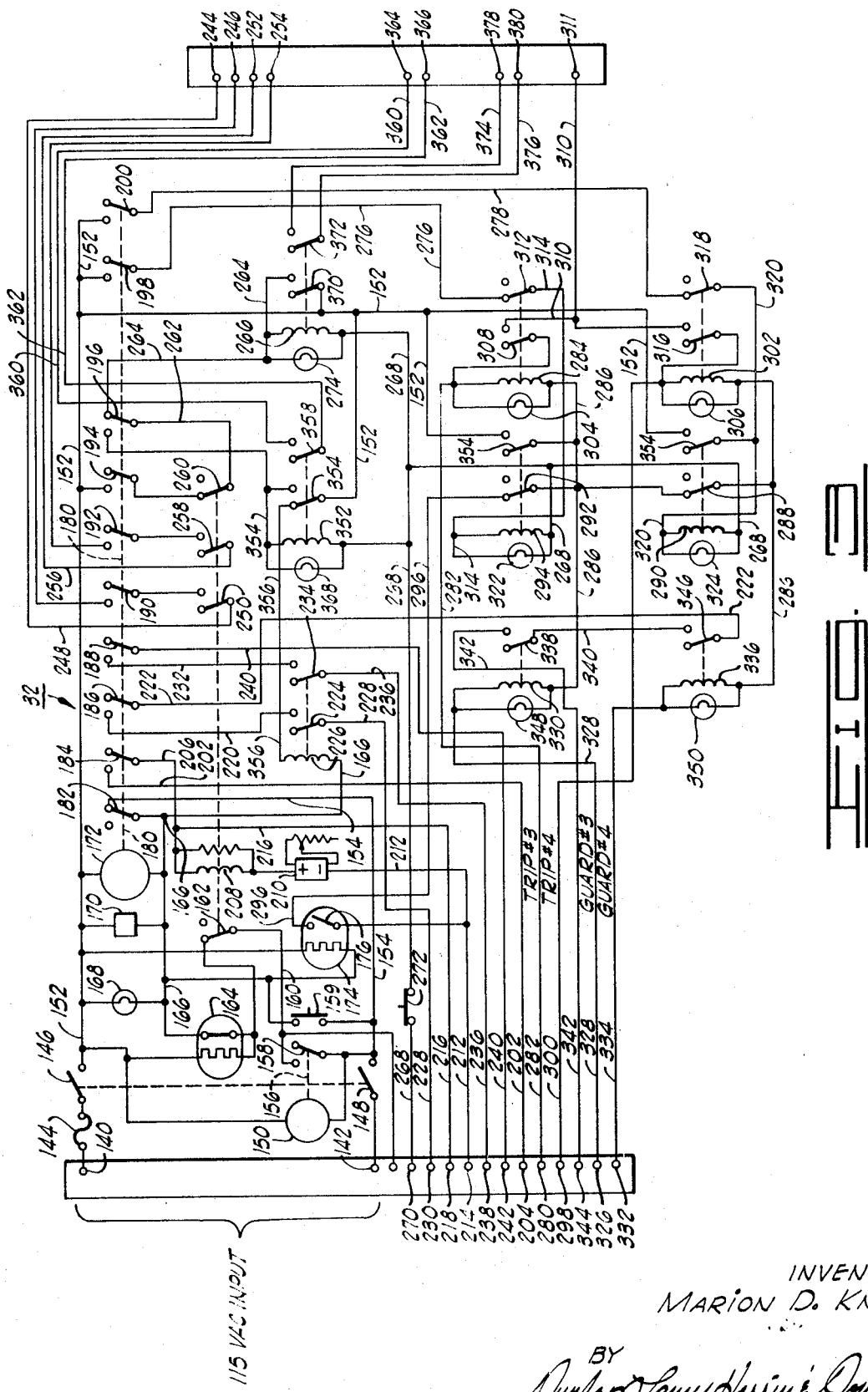

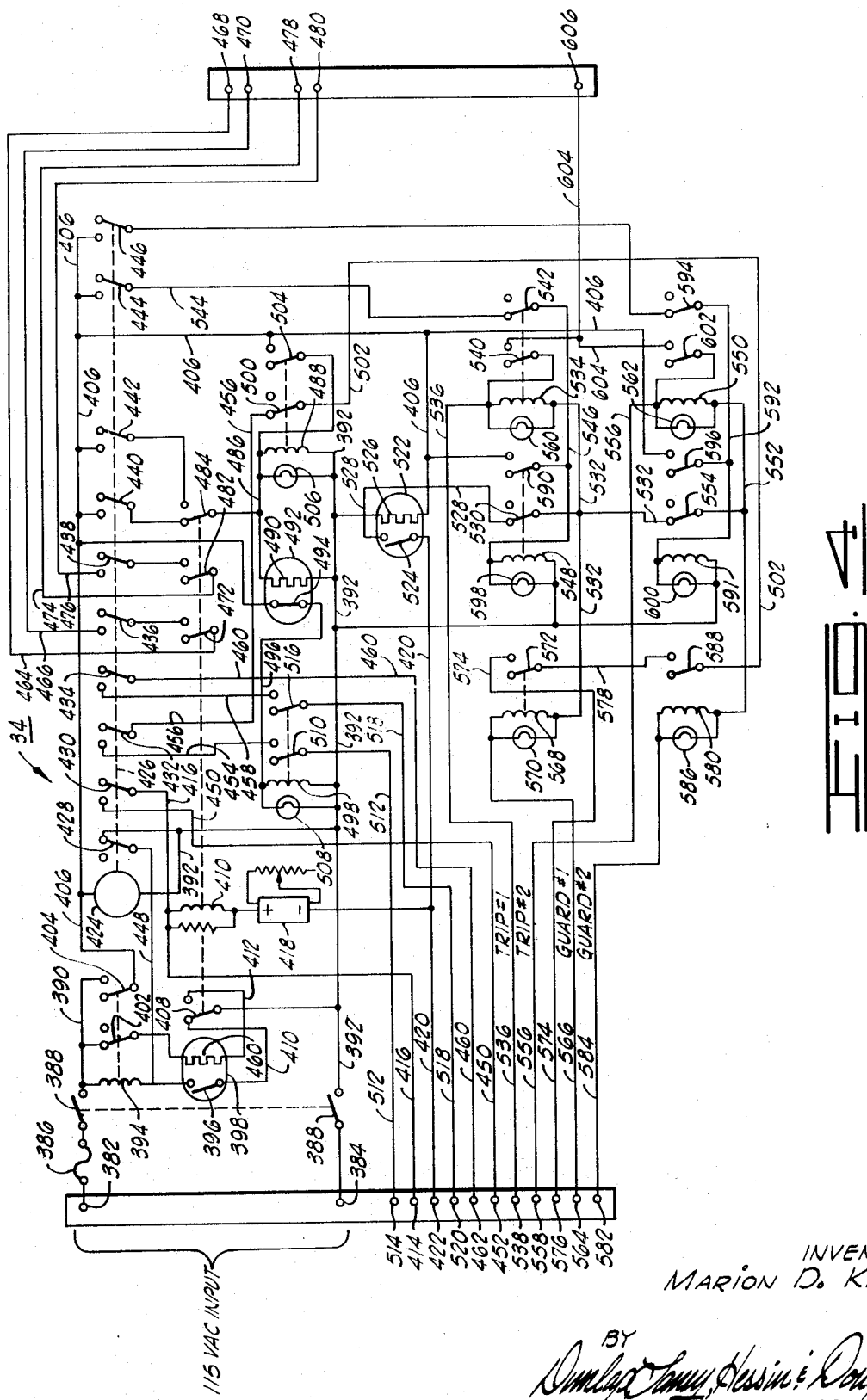

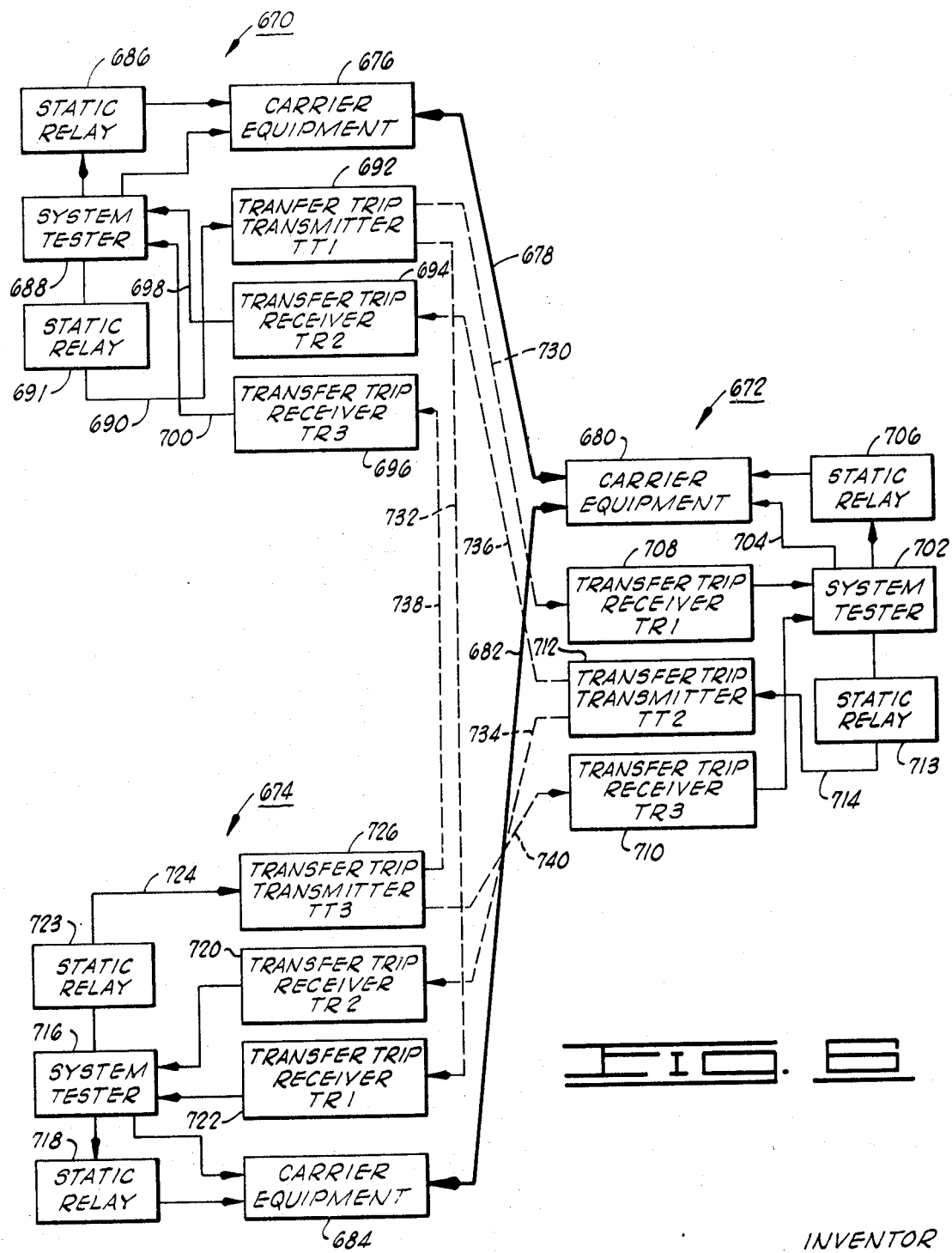

3,662,219

APPARATUS FOR AUTOMATIC RELAY SYSTEM TESTING

BACKGROUND OF THE INVENTION

1. Field of the Invention

The invention relates generally to apparatus for automatic testing of surveillance equipment for high voltage transmission lines and the like and, more particularly, but not by way of limitation, it relates to improved testing apparatus for carrying out automatic, programmed sequenced testing of directional comparison relaying carrier or tone systems as utilized in combination with transfer trip relaying carrier or tone equipment.

2. Description of the Prior Art

The prior art methods of testing directional comparison carrier equipment are disclosed fully in U.S. Pat. No. 3,414,773 issued Dec. 3, 1968 in the name of the present inventor and entitled "Automatic Carrier Circuitry for Testing Multiple Terminals Points Employing Timer Sampling Means." This teaching made full disclosure relating to a form of automatic testing apparatus which was periodically actuatable to perform a series of test sequences through one or more terminals of a directional comparison channels interconnected between one or more respective high voltage transmission line terminals, i.e., generation sources, sub-stations, etc. Prior to this patent teaching such testing procedures had been carried out by one or more working attendants, utilizing voice communication for synchronization purposes, wherein pre-determined sequence switching was effected to prove verity of the associated surveillance circuitry. Transfer trip relaying systems were similarly tested by attendant personnel carrying out their various coordination functions through manual switching and test energization of the respective transfer trip transmitter and their associated static relays. Such sequential, human operation function would naturally become quite lengthy and complex in any extensive protective relaying system, some of which have upwards of four to eight transfer trip and carrier on tone transmitters and receivers between but two terminals or control positions.

SUMMARY OF THE INVENTION

The present invention contemplates apparatus for automatic-testing of high voltage transmission line surveillance and protective equipment such as a directional comparison relaying system in combination with transfer trip transmitter and receiver interconnections. In a more limited aspect, the invention consists of one or more carrier or tone equipments operated by directional comparison relays on a high voltage transmission line, such equipment being interconnected between one or more surveillance positions and having one or more transfer trip transmitter-receiver interconnections in parallel association therewith. A first testing unit designated and programmed as master serves to periodically initiate a testing sequence whereupon one or more remote testing units are synchronized with the master testing unit to selectively enable a plurality of transmissions and conductions for test purposes, e.g., full power carrier, reduced power carrier, transfer trip transmitter send, transfer trip receiver receive, etc., to prove verity of all aspects of the system with alarm indication given upon failure of any phase of the testing.

Therefore, it is an object of the present invention to provide an automatic testing unit for periodic check of high voltage transmission line surveillance equipment which includes a directional comparison and one or more channels of transfer trip on the same line section.

It is also an object of the invention to provide a testing unit which is very reliable as to the average duration of trouble free filed service.

It is still further an object of the present invention to provide an automatic checkout and alarm system which provides functional test of solid state relay and carrier or tone equipment.

It is yet another object of the invention to provide check out equipment which includes an automatic programmer capable of performing protective relay system tests of pre-set duration periodically at a selectable number of cycles.

Finally, it is an object of the present invention to provide an automatic relay system test unit which can periodically test multiple terminal directional comparison static relays and carrier or tone equipment as they are employed in combination with one or more direct transfer trip channels, such programmed testing being made in either one or both directions as between one or more terminals or operating positions.

Other objects and advantages of the invention will be evident from the following detailed description when read in conjunction with the accompanying drawings which illustrate the invention.

BRIEF DESCRIPTION OF THE DRAWINGS

FIG. 1 is a simplified block diagram of one form of transmission line surveillance network employing carrier equipment in combination with transfer trip channels;

FIG. 2 is a block diagram which illustrates a relay system tester as constructed in accordance with the invention and one mode of interconnection into a carrier/transfer trip surveillance network;

FIG. 3 is a schematic diagram of an automatic system testing unit of the type which is employed at a master position;

FIG. 4 is a schematic diagram of an automatic system testing unit of a type which is employed at the remote positions;

FIG. 6 illustrates one form of three position interconnection having directional comparison carrier and three transfer trip channels each with two receivers at different locations.

DETAILED DESCRIPTION OF THE PREFERRED EMBODIMENT

Figure 5:
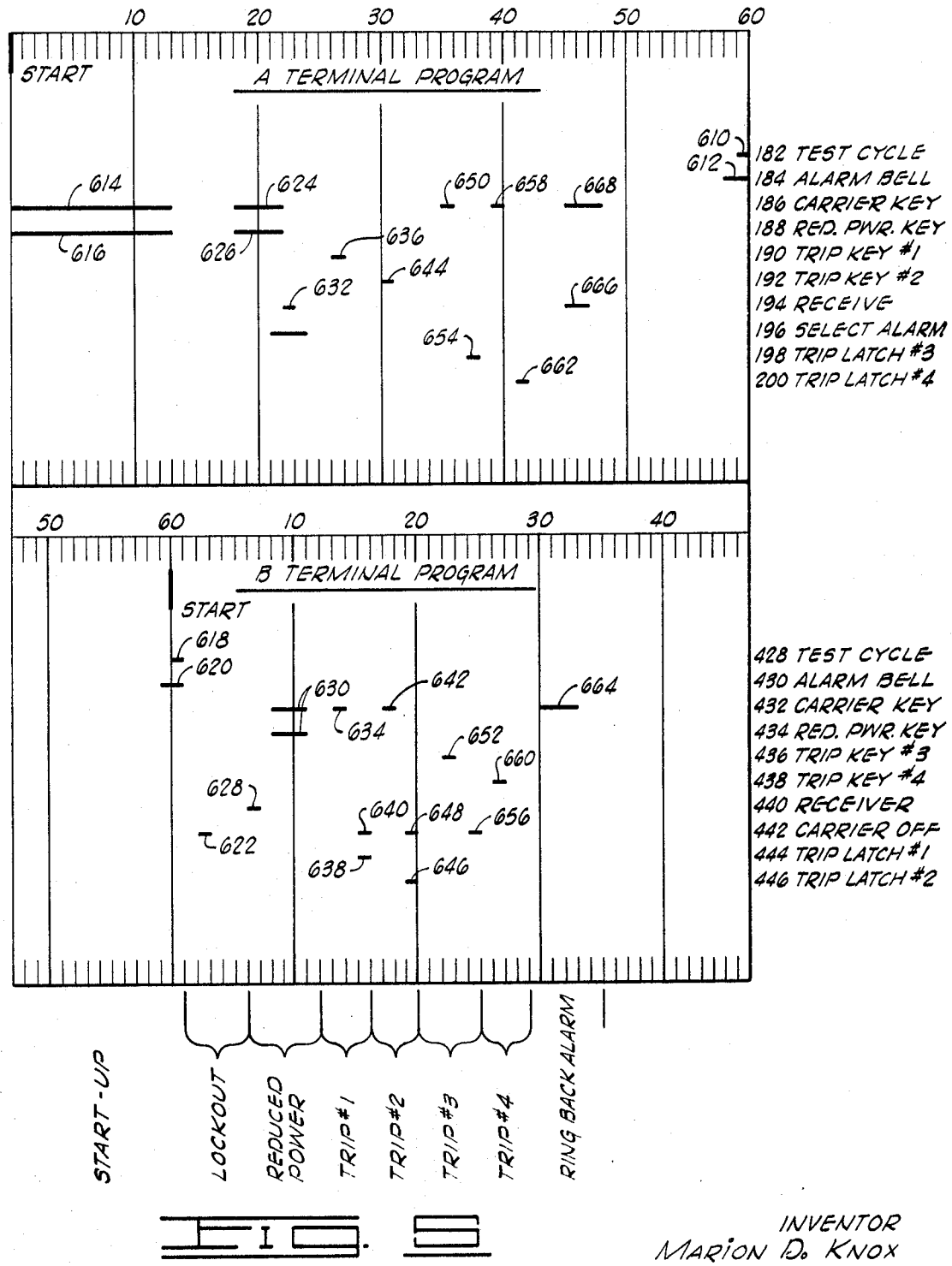
FIG. 5 illustrates in timer versus linear position a graphic representation of one form of program as utilized to provide actuation control between a master and a remote testing position.

FIG. 1 is a representative interconnection of directional comparison carrier equipment and associated transfer trip carrier transmitter and receiver equipment. It should be understood from the outset that the primary purpose and application of such as a surveillance network 10 is for the purpose of monitoring the condition and operation of electrical power transmission lines. Such surveillance networks have traditionally taken the form of microwave, power line carrier, audio tone, or pilot wire interconnections as applied to carry out protective relaying of the power system. In addition to the primary application of providing adequate relay protection to detect, locate and isolate system faults promptly while maintaining availability of power to the ultimate consumers, the interconnection systems also provide a channel of communication between two or more system locations.

Thus, the system 10 may be employed to span two operational positions 12 and 14 which include respective carrier systems 16 and 18 in operative connection with related power transmission equipment. Each of carrier or tone equipment 16 and 18 may be any of various well-known commercially available types, e.g., the General Electric Type CS-26 Carrier System. Such carrier or tone equipment including its transmitter and receiver assembly (not particularly shown) would be connected in conventional manner through line tuners and coupling capacitors for carrier communication via the transmission line span, while input to the carrier equipment would be provided from selective protective relay equipment receiving sense inputs from the power transmission lines and providing reactive output to the tripping coil of a selected form of conventional power line circuit breaker.

Also located at respective operational positions 12 and 14 are the transfer trip carrier or tone equipment consisting of a transmitter 20 at position 12 in one-way communication via interconnection 22 to a receiver 24 at position 14. In a similar disposition for interconnection in the opposite direction are a transfer trip transmitter 26 at position 14 which is in communication via interconnection 28 with receiver 30 at position 12.

Each of relay system testers 32 and 34, the master and remote system testers respectively, are then interconnected to control and coordinate operation of the respective carrier and transfer trip equipments. Thus, the relay system tester 32, as arbitrarily designated the master, is connected via link 36 to control carrier equipment 16 while the interconnections 38 and 40 lead to the respective transfer trip transmitter 20 and receiver 30. In similar manner, the remote system is interconnected by relay system tester 34 through line 42 to carrier equipment 18 and through connections 44 and 46 to the respective receiver 24 and transmitter 26 of the transfer trip apparatus.

Referring now to FIG. 2, a typical interconnection for a relay system tester 50 might find keying outputs 52, 54 and 56 connected to respective relays 58, 60 and 62 and these are controlled to provide input selectively to a logic test unit 64. The logic test unit 64 is another form of commercially available device which is employed for providing separate testing of solid state relay control circuitry. The logic test unit 64 is connected via lead 66 to the associated carrier equipment 68, a carrier transmitter and receiver although not specifically shown, which is then in interconnection via lead carrier link 70 to another carrier equipment 72 which would be located at some remote operating position or terminal. Outputs 74 and 76 from relay system tester 50 are energized in response to a command for selective energization of carrier 68 to transmit "full power" and "reduced power" respectively. This is a normal form of programmed carrier test output as is fully disclosed in the afore-mentioned U.S. Pat. No. 3,414,773.

Additional outputs from relay system tester 50 are available in response to program enabling via leads 78, 80 and 82 for energization of respective solid state relays 84, 86, and 88. Actually, depending upon the application and type of transfer trip transmitter-receiver network employed, the number of control relays 84 through 88 (Relay n) may vary through a considerable number. Outputs from the respective control Relays 1 through n (84-88) are then applied via respective leads to transfer trip transmitters 90, 92 and 94. The number of transfer trip transmitters 1 through n will also vary in accordance with application requirements, and their respective guard or trip frequency signal outputs are present on system interconnection lines 96, 98 and 100.

1 through n system receiver interconnections 102, 104 and 106 apply received transfer trip signals to 1 through n respective transfer trip receivers 108, 110 and 112. Each of the receivers 108-112 then provides either a guard or a trip output for application to the relay system tester 50. Thus, receiver 108 provides guard output connection 114 and a trip output connection 116, transfer trip receiver 110 provides a guard output connection 118 and a trip output connection 120 and, finally, receiver 112 provides guard output 122 and trip output 124.

Such transfer trip transmitter and receiver equipments may be selected from a number of commercially available types, e.g., the General Electric Transmitter Type CT-51-A as utilized in conjunction with Receiver Type CR-51-A. Further, such one-way transmitter-receiver linkages may be used in any number of multiples to transmit a wide variety of control indications or to interrogate control indication responses from a remote position by separate transmitter-receiver return linkages. Further, such transfer trip transmitter and receiver equipments may consist of either the frequency shift type or types which utilize audio control tone via microwave transmission. In any event, the transmission variations will provide a continuous receiver guard output during quiescent system operation, with a trip output enabled during alerting or special transmission conditions.

Relay system tester 50 may also be connected via a line 126 to an auxiliary relay 128. The auxiliary relay 128 constitutes a safe-guard measure for disabling a circuit breaker trip coil 130, a part of the transmission line circuit breaker 132, to prevent the operation of the circuit breaker during test procedures. Thus, auxiliary relay 128 can be actuated at programmed intervals by relay system tester 50 to remove the actuating voltage input 134 from connection with trip coil 130 so that various received test trip indications will not actually operate the transmission line circuit breaker 132.

Referring now to FIG. 3, the system tester 32 represents a typical tester as might be employed at a master operating station or terminal where initiation of test cycling occurs. Energizing line voltage input is applied between terminals 140 and 142 to provide system tester energization. Lead 140 is applied through a fuse 144 and off-on switch 146 while the other side of the line voltage input is applied through a remaining ganged switch section 148 of the off-on switch. A synchronous a-c motor 150 of the clock timer type is connected between the a-c energizing leads 152 and 154. The timer motor 150 is connected via a linkage 156 to periodically close normally open switch 158 to provide energizing a-c connection via lead 160 through normally closed relay contacts 162 which then apply energizing power to a time delay relay 164. The time delay relay 164 is normally closed to provide energizing power on lead 166 for a period of 10 seconds.

The a-c power application on lead 166 is connected to illuminate a green indicator lamp 168 as well as to energize a counter 170 and a synchronous program motor 172. Further, a time delay relay 174 having normally open contacts 176 is simultaneously energized such that contacts 176 are closed after about 2 seconds. The counter 170 may be any of various conventional types which serve to tally one count for each energization as occurring in each test initiation.

The synchronous motor 172 controls actuation of a plurality of switches in program sequence in a manner as set forth in the aforementioned U.S. Pat. No. 3,414,773. A suitable form of motorized program switch is known as a "Sealectro Switch" and is obtained from the Sealectro Corporation of Mamaroneck, N.Y. Thus, the synchronous motor 172 maintains programmable mechanical control via linkage 180 over a plurality of switch elements 182, 184, 186, 188, 190, 192, 194, 196, 198 and 200. The switch element 196 is a two position element while switch element 182 is normally closed and the remaining switch elements 184, 186, 188, 190, 192, 194, 198 and 200 are normally open switch elements.

Switch element 182 is normally closed to provide conduction as between a-c energizing lead 166 and the other a-c lead 154, this providing a holding bypass which maintains energizing power across program switch 172 until actuated open at the end of program sequence as will be further described below. The switch element 184 is normally open and actuatable closed to connect a lead 202 from alarm bell terminal 204 to a lead 206 which connects through a relay coil 208 in series with a time delay module 210 and a lead 212 return to negative supply voltage source at terminal 214. The relay coil 208 controls relay contact 162 and others, as will be further described. The time delay module 210 is a solid state, adjustable time delay which is critically adjustable to about 0.9 seconds delay to control switching of relay coil 208, the receive relay, as signal indication is received on lead 216 from carrier receive input terminal 218. A suitable form of time delay module of the solid state type is commercially available from the Artisan Electronics Company of Parsippany, N.J.

A normally open program switch element 186 provides periodic direct connection between a lead 220 and a lead 222 which leads to further relay contacting as will be further described. The lead 220 is attached to normally open relay contacts 224 as controlled by a relay coil 226 with further conduction via lead 228 to the carrier start terminal 230. Normally open switch element 188 provides periodic connection between lead 232 as energized by a relay contact 234, which is also energized by relay coil 226, with further conduction on a lead 236 to a "reduced power key" terminal 238. The remaining connection of switch element 188 is through a lead 240 to the other side of the "reduced power key" connection or terminal 242.

Program switch element 190 is normally open and actuatable to complete a circuit between the "No. 1 trip key" terminals 244 and 246, terminal 244 being connected through a lead 248 and normally open relay contact 250 as controlled by relay coil 208. The program switch element 192 fulfills the similar function with respect to the "No. 2 trip key" terminals 252 and 254, conduction being through lead 256 to the normally open relay contacts 258 which are also controlled for closure upon actuation or energization of relay coil 208.

A next normally open program switch element 194 connects between the a-c hot lead 152 and a normally closed relay contact 260, actuatable open by energization of relay coil 208, for further conduction by a lead 262 through the normally closed side of program switch element 196 to a lead 264 which provides energization of a relay coil 266 with return via lead 268 to a "supervisory reset" terminal 270. Lead 268 includes in series a manual reset switch 272, and a red lamp 274 is connected in parallel with relay coil 266 to indicate energization of same. Program switch element 198 connects from the a-c lead 152 through a lead 276 to an additional relay contact as will be further described below. Similarly, program switch element 200 connects from the a-c lead 152 through a lead 278 to the same relay bank to be described.

The individual functions of the various program switch elements 182 through 200 are as follows:
 182—Test Cycle
 184—Open Alarm Bell
 186—Carrier Key
 188—Reduced Power Key
 190—Trip Key No. 1
 192—Trip Key No. 2
 194—Receive Carrier
 196—Select Alarm
 198—Trip Latch No. 3
 200—Trip Latch No. 4

A "trip No. 3" input is received at a terminal 280 for conduction via a lead 282 to energize a relay coil 284 with return to a common lead 286. The common lead 286 provides return connection for the various relays to be described, and its return circuit as completed through relay contacts 292 is operated by relay coil 294 with further connection along a lead 296 back to the contacts of the time delay relay 174 which is connected to the lead 212 and negative voltage return terminal 214.

Input received from the "trip No. 4" input as applied at the terminal 298 is conducted via lead 300 to energize a relay coil 302, return being through relay contact 288 and leads 286 as before described. Blue indicator lamps 304 and 306 are connected in parallel with each of the respective relay coils 284 and 302 to provide indication of the particular "trip No. 3" or "trip No. 4" condition. Energization of relay coil 284 closes relay holding contacts 308 so that a d-c voltage on lead 310 latches relay 284. Also, a relay contact 312 removes connection of a lead 214 from lead 276, lead 314 also providing energizing power to alarm relay coil 294 with return through lead 286.

Upon energization of the "trip No. 4" relay coil 302, relay contact 316 makes a circuit between lead 310 from terminal 311 (positive d-c voltage supply) to provide holding current for application to relay coil 302. A further relay contact 318 breaks energizing connection between lead 278 from program switch element 200 and a lead 320 which connects to the alarm relay coil 290 as return through the "supervisory reset" lead 268. A pair of red indicator lamps 322 and 324 are connected in parallel with respective alarm relay coils 294 and 290 to show energization.

"Guard No. 3" input is present at a terminal 326 via lead 328 to relay 330, and "guard No. 4" is present on a terminal 332 and lead 334 as connected to energize a relay coil 336. Relay 330 is actuatable to close normally open relay contact 338 to provide "carrier start" conduction from lead 340 through a lead 342 to "carrier start" terminal 344. Normally open relay contacts 346 also actuate closed to provide connection of the lead 340 to lead 222 from the program switch element 186 which controls carrier keying. A pair of green indicator lamps 348 and 350 are connected in parallel with each of respective relay coils 330 and 336 to indicate energized condition.

An alarm relay coil 352 is connected for energization between supervisory reset lead 268 and a lead 354, the normally open connection to program switch element 196. Relay coil 352 is energized to actuate the relay contacts 354 such that energizing power from a-c lead 152 is removed from a lead 356 which provides energization of relay coil 226 with return via the other a-c lead 166. The actuated position of relay contact 354 then connects lead 354 to a-c lead 152 as holding energization for alarm relay coil 352.

Relay contact 358 is energized closed by relay coil 352 to connect a pair of leads 360 and 362 which provide carrier alarm output at respective terminals 364 and 366. An amber indicator lamp 368 is connected in parallel with alarm relay coil 352 to indicate the alarm condition whenever it occurs. The relay coil 266 as energized in the normal position of program switch 196 receives holding actuation from lead 264 by means of relay contact 370, and a normally open relay contact 372 is actuated closed to connect leads 374 and 376 to respective terminals 378 and 380, the "transfer trip alarm" outputs.

Referring now to FIG. 4, a schematic diagram of what may be employed as a remote relay system tester unit 34 is shown and it is described hereafter. The system tester 34 is essentially the same as the master system tester 34 as previously described; however, it may be noted that there is no master timer or 24 hour clock or cycling mechanism included, and that there are several connector terminals which are obviated through interaction of slaving functions. Thus a-c input is applied between terminals 382 and 384 through a suitable fuse element 386 and ganged switch assembly 388 such that a-c energization is available between leads 390 and 392. Lead 390 is connected through relay coil 394 to normally open relay contact 396 of a time delay relay 398. Time delay relay 398 has a 10 second delay duration and is energized through energizing element 460 as connected to a normally closed relay contact 402 controlled by relay coil 394. Relay contact 404 also energized by relay coil 394 provides connection of the a-c input lead 390 to an a-c lead 406.

A relay contact 408 as controlled by a relay coil 410 is normally positioned to connect lead 392 through a lead 410 to the time delay relay contact 396. When relay coil 410 is energized, relay contact 408 connects the a-c lead 392 through a lead 412 to the relay element 460 of time delay 398. The relay coil 410 is the "carrier receive" relay and is energized by carrier receive input at terminal 414 as applied via lead 416 to energize relay coil 410. The return to energize relay coil 410 is through an adjustable time delay module 418 and a lead 420 to the negative d-c voltage supply present at terminal 422. The time delay 418 is a commercially available type similar to that described with respect to time delay 210 of FIG. 3.

The remote or slaved system tester 34 also utilizes a synchronous motor driven program switch similar to that employed in the master system tester 32. (FIG. 3). Thus, a synchronous motor 424 is connected via linkage 426 to actuate in program sequence each of a plurality of program switch elements 428, 430, 432, 434, 436, 438, 440, 442, 444, and 446. Each of these switch elements 428 through 446 has a system testing function as follows:
 428—Test Cycle
 430—Open Alarm Bell
 432—Carrier Key
 434—Reduced Power
 436—Trip Key No. 3
 438—Trip Key No. 4
 440—Receive Carrier
 442—Check Carrier Off
 444—Trip Latch No. 1
 446—Trip Latch No. 2

Switch element 428 is normally closed to connect a-c return from lead 392 via lead 448 for energization of relay coil 394 at all times other than the stand-by condition when it is programmed open. Switch element 430 connects "carrier receive" input on lead 416 to a lead 450 and terminal 452, the "alarm bell" terminal. Switch element 432 is actuated closed to provide "carrier key" by connecting lead 454 when lead 456, each leading to secondary relay actuations to be further described.

Program switch element 434 connects lead 458 with a lead 460 which connects to the "reduced power" terminal 462. Program switch element 436 is actuated closed to provide connection between leads 464 and 466 connected to respective terminals 468 and 470 which provide "trip Key No. 3" actuation. Leads 464 and 466 are completed only upon further energization through relay contacts 472 as actuated closed in response to energization of the receive relay coil 410. Similar actuation is effected as between leads 474 and 476 to terminals 478 and 480 upon closure of receive relay contact 482, this providing "trip key No. 4" actuation between terminals 478 and 480.

The program switch element 440 connects the a-c lead 406 through the normal position of receive relay contacts 484 to a lead 486 which is then applied through each of the parallel-connected relay coil 488 and actuating element 490 of a time delay element 492. The time delay 492 includes time delay contacts 494 which are normally closed for a 5 second period to conduct a-c energization from lead 406 to a lead 496 for subsequent energization of a relay coil 498. Upon energization of relay coil 488, relay contacts 500 break connection between lead 456 and a lead 502 which is applied to further relay connection as will be described, and relay contacts 504 are actuated into connection with lead 406 to provide a relay holding energization. A red indicator lamp 506 is connected in parallel with relay coil 488 to indicate energization.

The lockout relay coil 498 as energized by time delay contact 494 is parallel by a green indicator lamp 508 and, upon energization, its contact allow full and reduced power keying control. Thus, relay contact 510 may be energized closed to connect lead 454 from carrier key program element 432 to a lead 512 and terminal 514, the carrier start output terminal. Similarly, a relay contact 516 is actuated closed to make connection between 458 and reduced power program switch element 434 for conduction through a lead 518 to reduced power key terminal 520.

A time delay relay 522 includes normally open contacts 524 as controlled by a time delay heater element 526 connected between the a-c lead 392 and the a-c lead 406. Upon closure of time delay contacts 524, a lead 528 is connected from a relay source, as will be further described, for application to the lead 420 and the negative d-c voltage terminal 422. Thus, lead 528 is conducted through the normal closed position of a relay contact 530 to place negative d-c voltage on a lead 532 for application to various relay coils as will be further described below.

A relay coil 534 is connected between the negative voltage lead 532 and a lead 536 which is brought out to a trip No. 1 terminal 538. The relay 534 is energized to close normally open relay contact 540 to provide holding energization, and to open a normally closed relay contact 542 thereby to open the circuit between lead 544 to the No. 1 trip latch program element and a lead 546 which supplies energization to a relay coil 548. A relay coil 550 is connected for energization between a lead negative voltage 552, lead 556 which is connected to "trip No. 2" terminal 558. Blue indicator lamps 560 and 562 are connected in parallel with each of relay coils 534 and 550 respectively to show energization.

Guard input No. 1 is monitored by means of signal indication at terminal 564 and on lead 566 as connected to the relay coil 568 with return through negative voltage lead 532. Parallel-connected green lamp 570 provides energization indication at which time normally open relay contact 572 is closed to make connection between a lead 574 to "carrier start" terminal 576 and a lead 578. Guard input No. 2 is monitored by means of signal indication at terminal 582 and on lead 584 connected to relay coil 580 with return through lead 552 and relay contact 554. As indicated by illumination of green indicator lamp 586, a relay contact 588 is energized closed to connect lead 578 to the lead 502 which is conducted back to the "carrier key" program switch element 432.

Finally, with respect to alarm relay coil 548, it also controls a normally open relay contact 590 which connects a-c holding energization from a-c lead 406 to lead 546 under alternative circumstances as required. Alarm relay coil 591 is connected between a-c lead 392 and a lead 592 from a normally closed relay contact 594 for conduction back to the "trip latch No. 2" program switch element 446. The relay coil 591 controls the normally closed relay contact 554 as well as a normally open relay contact 596 which connects a-c lead 406 to lead 592 to provide holding energization. Holding energization is also provided for relay coil 550 by means of the normally open relay contact 602 which connects via lead 604 back to a positive d-c voltage terminal 606.

OPERATION

It should be understood of course that the automatic system tester may be compounded variously to monitor and test any of a large plurality of functions at one or more operating positions which utilize any of several combinations of surveillance equipment. Thus, the system is capable of checking directional comparison channels in combination with one or more direct transfer trip channels in one or more directions and at one or more operating locations. For simplicity, a relatively simple system is selected for operational description. That is, a system as shown generally in FIG. 1 which is utilized between two operating positions 12 and 14 and having a master relay system tester 32 and a single remote system tester 34. However, as noted from reference to FIG. 5, there is one difference in that the surveillance system utilizes a dual transfer trip transmitter-receiver network in each direction in addition to the carrier equipment interconnection. This is a usual form of transfer trip application wherein dual transmitters operate in conjunction with dual, remotely disposed receivers, and a dual transfer trip channel is installed in parallel therewith in the opposite direction.

Assuming then that a system utilizing relay system testers 32 and 34 (such as are disclosed in FIGS. 3 and 4) is in operation, the program schedule as shown in FIG. 5 may be instituted to carry out the various check and functional test operations. With reference to FIGS. 3, 4 and 5, closure of the on-off switches 146–148 and 388 will enable the master and remote systems testers 32 and 34. Thereafter, at the master A terminal or relay system tester 32, either the manual "test" switch 159, the clock switch 158, or a selected supervisory relay contact, will energize each of the program motor 172, the 2 second, normally open time delay 174, the lock out relay coil 226, the "Test On" green indicator lamp 168, and the test cycle counter 170. Any test initiation during use of carrier for other supervisory purposes is prevented at the master system tester 32. Both the clock and supervisory starting signals will pass through a set of normally closed contacts 162 as controlled by the carrier receive relay coil 208 which opens the start-up circuit during use of carrier.

After the first second the test cycle program switch element 182 closes (as shown in FIG. 3) to cause holding a-c return to motor 172 for one complete cycle. The element 182 will remain in the closed position until program interval 610, the final second of the cycle, as shown in FIG. 5. The alarm bell element 184 is normally open for the test cycle to cut off the local alarm bell energization, and it will remain in this position until the very end of the test cycle. i.e. program interval 612 of FIG. 5, whereupon element 184 is closed to energize the local alarm bell circuit.

After two more seconds, the thermal time delay relay 174 closes contacts 176 to apply a d-c ground to the guard and trip relay coils 330, 336, 284 and 302 through the respective relay contacts 292 and 288 of alarm relay coils 294 and 290. The guard relay coils 330, 336 will be energized if both guard channels Nos. 3 and 4 are being received from the location of the remote system tester 34. That is, guard frequency signals should be received from the transfer trip transmitters at the remote position by receivers located at the master position whereupon the receiver indications through such as relay actuation will provide signal indication at terminals 326, and 332 for conduction via leads 328 and 334 to energize the respective guard relay coils 330 and 336.

At position 1 of the A terminal program of FIG. 5, the carrier key element 186 and/or the reduced power carrier key element 188 are closed to key reduced power carrier for 13 seconds or the duration of program intervals 616 and 614. The reduced power carrier key signal from switch element 188 is present on lead 240 to terminal 242, but it may be noted that it is derived through closed contacts 234 of a lockout relay 226. Thus, carrier transmitter output may be keyed in conventional manner at either full or reduced power depending upon equipment option and the presence of "carrier start" or "reduced power key" indications.

At the remote terminal, if carrier is being received by the carrier system associated with system tester 34 (FIG. 4), the associated time delay relay 398 begins to heat up through a closed contact 408 controlled by energization of the carrier receive relay coil 410. When relay coil 410 drops out, i.e., after 13 seconds of continuous carrier reception from the master terminal, relay coil 394 is energized to apply a-c line voltage to a-c lead 406 and the synchronous motor 424 to drive the plurality of switch elements through their proper programmed sequences. Energization of relay coil 394 also applies line voltage across the two second, normally open time delay relay 522, the lock out relay coil 498, and the green "-test on unlocked" lamp 508.

The remote synchronous motor 424 is then running and is in synchronization with the synchronous motor 172 within system tester 32 at the master terminal. The motor 424 will continue running until the end of its 60 second test cycle, at which time the test cycle element 428 will open to remove the ground from relay coil 394 thereby to stop synchronous motor 424. Referring to FIG. 5, the program interval 618 illustrates the point at which element 428 is actuated open, and it is actually the final one second in the overall program interval. Also, the local alarm bell element 430 is opened to prohibit local alarm bell until the final two seconds of the test cycle as indicated by program interval 620.

After two seconds of energization, time delay relay 522 closes relay contacts 524 to apply a d-c ground from terminal 422 and lead 420 through relay contacts 530 to allow energization of the guard relay coils 568 and 580 as well as the trip relay coils 534 and 550. Then, the guard relay coils 568 and 580 can be energized and indicated by illumination of green lamps 570 and 586 if both guard channels No. 1 and No. 2 receive signal indications from the master terminal or system tester 32, as applied to terminals 564 and 582 via respective leads 566 and 584.

It may be noted here that a long burst of carrier, if more than 10 seconds in duration, could start up the remote terminal; however, after starting, it is required that there must be a verification of a security code before proceeding with the test, and such verification prohibits false cycling in response to various other supervisory or spurious signals present on the carrier interconnection.

At position two of motor 424 at the the remote terminal, the "carrier off" element 442 is actuated closed (program interval 622) to provide a check that all carrier is off. This is the first part of the security code. At the master terminal system tester 32, program motor 172 now being at its position 19, element 186 and/or 188 again close (program intervals 624 and 626) to key reduced power carrier for four seconds. At the remote terminal system tester 34, program element 440 is closed for a one second program interval 628 to verify reception of the second portion of the security code. If carrier is not being received at this time, the relay coil 410 of tester 34 remains de-energized, alarm relay coil 488 energizes, red "alarm" lamp 506 lights up, time delay 492 then heats up to de-energize the relay coil 498 such that the terminal will lock out.

Another portion of the test checks for reduced power ring back. At the A terminal tester 32, the "select alarm" element 196 is actuated to select the carrier alarm relay coil 352 and associated alarm lamp 368. At the B terminal tester 34, program interval 630, the "carrier key" element 432 and/or the "reduced power" element 434 close to key reduced power for 3 seconds. At A terminal tester 32, the "receive" element 194 closes for one second at program interval 632 to verify the reception of a carrier from the B terminal tester 34. If carrier is not received at A terminal tester 32 at this time, the relay coil 208 remains de-energized and the "carrier" alarm relay coil 352 will energize to de-energize lockout relay coil 226 and cause lock out of the terminal.

The test sequence then progresses into testing of the transfer trip channel No. 1. At the B terminal tester 34, the carrier key element 432 closes to key carrier at full power for one second during program interval 634, i.e., if there are no alarms, and if the B terminal tester 34 is receiving both channel NO. 1 and channel No. 2 guard signals as evidenced by energization of the respective guard relay 568 and 580. At the A terminal, during program interval 636, the trip key element 190 is closed for one second. At the same time, B terminal carrier is being received at the A terminal, but carrier receive relay coil 208 remains de-energized for a period of time determined by the adjustable time delay module 210 and its associated resistor. Approximately 0.9 seconds after the start of B carrier, relay coil 208 energizes to close the normally open trip key No. 1 circuit. That is, carrier receive relay contacts 250 are closed to complete the circuit through trip key No. 1 element 190 to the terminals 244 and 246 which key the channel to trip. At the B terminal tester 34, when the channel switched from guard to trip, the guard relay coil 568 is de-energized and trip relay coil 534 is energized to the latching position. The loss of guard turns off the carrier channel which turns off the trip keying command and the transfer trip channel No. 1 then switches back to guard and the guard relay coil 568 again become energized.

At the B terminal tester 34, program intervals 638, the trip latch No. 1 element 444 is closed to verify that a trip was received on channel NO. 1 and, if no such verification occurs, the channel will alarm and the terminal 34 will lockout. The "-carrier off" element 442 is also closed for one second during program interval 640 to check that all carrier is off. If the trip was not received, channel No. 1 alarm relay coil 548 energizes to remove the negative d-c to all relay coils 568, 580, 534 and 550 such that loss of guard indications will stop any further transmission of carrier by the B terminal tester 34. This will prevent further testing such as should occur for transfer trip channel NO. 2. In the event that channel No. 1 verifies, transfer trip channel No. 2 will then be checked. Thus, at B terminal relay tester 34, after channel No. 1 has operated properly, the switch element 432 closes to key carrier full power for one second during program intervals 642. This carrier key is effected if there are no stored alarms and if both channel No. 1 and channel NO. 2 guard signals are being received at respective terminals 564 and 582. At A terminal relay tester 32, trip key switch element 192 closes for one second, program interval 644. Simultaneously, B carrier is being received at the A terminal relay tester 32, but receive relay coil 208 remains de-energized for a period of time as determined by the adjustable time delay module 210. This is approximately 0.9 seconds after the start of carrier from the B terminal, whereupon relay coil 208 is energized to close the normally open switch 192 thereby to key the channel NO. 2 to trip.

At B terminal relay tester 34, if the channel switches from guard to trip, the guard relay coil 580 de-energizes and trip relay coil 550 energizes to the latching position. Channel No. 2 then switches back to guard and guard relay coil 580 energizes. At the B terminal relay tester 34, during position interval 646, the contact element 446 closes to verify that a trip was received on channel No. 2 and, if not received, the channel alarms and the terminal locks out. At position interval 648, element 442 closes to check that all carrier is off. If a trip was not received, channel No. 2 alarm relay coil 591 energizes to remove negative d-c connection from the relay coils 580 and 550 to prevent further transmission of carrier from the B terminal.

Program testing then proceeds further to verify circuitry of transfer trip channel No. 3. At A terminal relay tester 32, switch element 186 is closed during position interval 650 to key carrier full power for one second if there are no stored alarms and if the A terminal relay tester has indication as to reception of both channel No. 3 and channel No. 4 guard signals. At the B terminal relay tester 34, switch element 436 closes during program interval 652 for one second and, at the same time, carrier from the A terminal is being received at the B terminal, but the carrier receive relay coil 410 remains de-energized for a period of time determined by the adjustable time delay module 418. Here again, this is adjusted to approximately 0.9 seconds after the start of receiving the A terminal carrier, whereupon relay 410 energizes to close a normally open trip key No. 3 circuit thereby to key the channel No. 3 to trip. At the A terminal relay tester 32, if the channel switches from guard to trip, the trip relay coil 284 will energize and latch to cause channel No. 3 to return to the guard transmission and, thereafter, the guard relay coil 330 energizes.

At the A terminal relay tester 32, switch element 198 closes during position interval 654 to verify that a trip was received on channel No. 3 or else the channel will alarm to lock out the terminal. If no trip indication is received, the channel No. 3 alarm relay coil 294 will energize to remove the negative d-c connection for all guard and trip relay coils and any further transmission of carrier by the A terminal installation will be stopped. At the terminal relay tester 34, program switch element 442 closes during program interval 656 to verify that all carrier is off.

If the test verifies through the channel No. 3 transmission check, testing proceeds with respect to transfer trip channel No. 4. Thus, during a terminal program interval 658, the element 186 keys carrier at full power for one second if there are no stored alarms, and if both channels No. 3 and No. 4 guard signals are being received. At the B terminal relay tester 4, element 438 closes during program interval 660 while carrier is received; however, carrier receive relay coil 410 remains de-energized for a period of time determined by the adjustable time delay module 418. After pre-set delay, relay coil 410 energizes to close the normally open trip key No. 4 circuit to key channel No. 4 to trip.

At the A terminal tester 32, if the channel switches from guard to trip, the guard relay coil 336 de-energizes and the trip relay coil 302 energizes to latch. Carrier turns off and channel No. 4 transmission then switches back to guard and guard relay 336 energizes. Again at the A terminal relay system tester 32, at position interval 662, the verified trip switch element 200 closes to verify that a trip was received on channel No. 4 and, if not, the channel will alarm to lock out the terminal. In the event that no trip verifies, the alarm relay coil 290 is energizes to remove negative d-c return from guard and trip relay coils 336 and 302 thereby to prevent any further transmission of carrier by the A terminal tester No. 32.

The alarm ring back phase of testing is then instituted at the B terminal relay tester 34 during position interval 664 when carrier key element 432 is energized to key full power carrier for 3 seconds if no alarm has been stored at the B terminal relay tester 34. An absence of this carrier transmission will signify to the A terminal tester 32 that the B terminal tester 34 had alarmed on one of the transfer trip channels. At the A terminal, the carrier receive element 194 closes during program interval 666 to verify reception from the B terminal tester 34. At a terminal program interval 668, the carrier key switch element 186 closes for 3 seconds if no transfer trip channel alarm had been stored at the A terminal. If at any time the unit fails to obtain the proper start-up signal, ring back, presence or absence of the carrier or the proper security code, all units will alarm, lock out, stop testing, and the alarm will be reported and stored at the master or A terminal relay tester 32. Any alarms which may then be repeated at the control center must be personally acknowledged by an attendant and manually reset at the A terminal relay tester 32.

The foregoing operational description was carried out with respect to a two terminal or dual operating position system for the sake of clarity through avoidance of compounding a plurality of like functions. Thus, the same or similar testing systems are installed between a plurality of more than two operating positions and their respective program switch controls are set-up accordingly. Thus, as shown in FIG. 6, a three position relay testing system is connected for periodic equipment testing between three equipment positions, terminal 670, terminal 672 and terminal 674.

The surveillance network of FIG. 6 represents a three channel of transfer trip, each with two receivers directional comparison relay and carrier system testing interconnection. Terminal 670 includes carrier equipment 676 as interconnected by a carrier line or suitable interconnection 678 to a carrier equipment 680 at terminal 672. In like manner, the carrier equipment 680 attaches through further interconnection 682 to a carrier equipment 684 located at position 674. At position 670, the carrier equipment 676 is controlled in response to inputs from a static relay 686 and/or a system tester 688. The system tester 688 is interconnected via line 690 to a transfer trip transmitter 692 while respective transfer trip receivers 694 and 696 connect via respective lines 698 and 700 to the system tester 688.

Similar installations are present in each of terminals 672 and 674. Thus, carrier equipment 680 is interconnected with a system tester 702 by both a direct connection 704 and connection through a static relay 706. The position includes transfer trip receivers 708 and 710, each of which is controlled through system tester 702, and a transfer trip transmitter 712 receives keying control via line 714 from system tester 702. The transfer trip and carrier equipment at terminals 674 is of similar type with a system tester 716 and static relay 718 connected into carrier equipment 684. Transfer trip receivers 720 and 722 function through system tester 716 while keying control is supplied via line 724 to transfer trip transmitter 726.

The respective transfer trip equipments at the various terminals 670, 672 and 674 are then interconnected in a selected manner whereby proper indications will be transmitted, and the respective program switch programs as contained in respective system testers 688, 702 and 716 will be pre-set in selected manner. In this particular installation then, transfer trip transmitter 692 at terminal 670 transmits frequency shift energy via dash-line routes or interconnections 730 and 732 to the respective transfer trip receiver 708 at terminal 672 and transfer trip receiver 722 at terminal 674. Transfer trip transmitter 712 at terminal 672 transmits via interconnections 734 and 736 to transfer trip receiver 720 at terminal 674 as well as to transfer trip receiver 694 at terminal 670. Finally, the transmitter at terminal 674, transfer trip transmitter 726, transmits via dash-line interconnections 738 and 740 to the respective transfer trip receiver 696 at terminal 670 and transfer trip receiver 710 at terminal 672.

In a situation where two transfer trip receiver at different locations receive guard and trip signals from the same transmitter, one receiver first verifies guard signal is present, trip output is blocked, if necessary; and then keys the directional comparison channel to pass this information to the other receiver location where it is verified and combined with guard and blocked trip condition there before keying a command to the transfer-trip transmitter to trip. Trip latch checks are then made at each receiver location to verify a trip was received for each channel.

It should be understood that such directional comparison and/or transfer trip transmission testing can be carried out as between any number of operating positions to monitor and test any number of channels. Thus, in addition to high tension power line surveillance and testing, the automatic testing and program sequencing of transfer trip equipment might be utilized for any number of surveillance methods such as railroad signal switching, telephone line monitoring, television microwave system surveillance, and many different types of telemetry monitoring system. A system tester constructed in accordance with the present invention is extremely versatile as to the number and type of program which it can accept and carry out with a high degree of reliability.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Apparatus for automatic-testing of a protective relaying system having first and second directional comparison relay circuits interconnected and being in combination with transfer trip transmitter and receiver interconnection in parallel with the relay circuit interconnection, said transmitter normally transmitting a first frequency guard signal and being controllable to transmit a second frequency trip signal indicative of a pre-set condition, said apparatus comprising:
   first means receiving test sequence energization and thereafter generating a series of test actuations;
   second means connected to be energized by a selected one of said test actuations to control said transfer trip transmitter to transmit said trip signal; and
   third means responsive to said transfer trip receiver upon receiving said second frequency trip signal to cause characteristic energization of said relay circuit interconnection to indicate at said first means the reception of said trip frequency signal by said receiver.

2. Apparatus as set forth in claim 1 wherein said first means comprises:
   program switch means which is periodically energized to effect a plurality of said test initiation actuations in a pre-set sequence.

3. Apparatus as set forth in claim 2 wherein said program switch means comprises:
   motor means energizable to provide constant rotational output;
   plural actuation means each receiving said rotational output; and
   plural switch means positioned adjacent each of said plural actuation means to be actuated thereby in accordance with pre-set program sequence.

4. Apparatus as set forth in claim 1 wherein said second means comprises:
   receive relay means energized in response to presence of said characteristic energization of said relay circuit interconnection to enable said first means test initiation actuation to key said transfer trip transmitter to the trip transmission.

5. Apparatus as set forth in claim 4 which is further characterized to include:
   switch means actuated by said receive relay means energization to operate a trip key input to said transfer trip transmitter.

6. Apparatus as set forth in claim 1 wherein said third means includes:
   remote program switch means energized to generate a series of second test actuations in synchronism with said first means test actuations.

7. Apparatus as set forth in claim 6 wherein said remote program switch means comprises:
   motor means energizable to provide constant rotational output;
   plural actuation means each receiving said rotational output; and
   plural switch means positioned adjacent each of said plural actuation means to be actuated thereby in accordance with pre-set program sequence.

8. Apparatus as set forth in claim 6 which is further characterized to include:
   guard relay means energized upon guard frequency signal being received at said transfer trip receiver to enable said characteristic energization of said relay circuit interconnection as effected by a pre-set one of said second test actuations.

9. Apparatus as set forth in claim 8 wherein:
   said relay circuit interconnection consists of a transmitter and receiver interconnected for two-way carrier communication.

10. Apparatus as set forth in claim 8 wherein said second means comprises:
    receive relay means energized in response to presence of said characteristic energization of said relay circuit interconnection to enable said first means test initiation actuation to key said transfer trip transmitter to the trip transmission.

11. Apparatus for automatic testing of protective relay systems of the scheme where two-way directional comparison circuitry operating between first and second positions functions in parallel with first and second transfer trip channels transmitting either guard or trip signal in each direction between said first and second positions, the apparatus comprising:
    first program means located at said first position and providing a series of first test actuations after initial energization;
    second program means located at said second position and providing a series of second test actuations after initial energization;
    first and second guard relay means located at respective first and second positions and each being enabled upon receipt of guard signal to provide respective first and second guard outputs during a selected one of respective first and second test actuations;
    first and second circuit means located at respective first and second locations, each receiving said first and second guard outputs to cause respective bi-directional characteristic indication transmission by said directional comparison circuitry;
    first and second relay means located at respective first and second locations, each being responsive to reception of characteristic indication on said directional comparison circuitry to generate respective first and second trip outputs; and
    first and second test actuation means each conducting respective first and second trip outputs when actuated closed by respective first and second program means to key trip signal transmission of a respective transfer trip channel.

12. Apparatus as set forth in claim 11 wherein each of said first and second program means comprises:
    motor means energizable to provide constant rotational output;
    plural actuation means each receiving said rotational output; and
    plural switch means positioned adjacent each of said plural actuation means to be actuated thereby in accordance with pre-set program sequence.

13. Apparatus as set forth in claim 11 wherein:
    said two-way directional comparison circuitry consists of a transmitter and receiver interconnected for two-way carrier communication.

14. Apparatus as set forth in claim 11 which is further characterized to include:
    additional transfer trip communication channel interconnected in parallel with said two-way directional comparison circuitry and functioning in combination therewith to transmit either guard or trip signals in each direction between said first and second positions;

third and fourth guard relay means located at respective first and second positions and each being enabled upon receipt of guard signal transmitted by said additional transfer trip channel to provide respective third and fourth guard outputs during a selected one of respective first and second test actuations;

third and fourth circuit means located at respective first and second locations, each receiving said third and fourth guard outputs to cause respective bi-directional characteristic indication transmission by said directional comparison circuitry;

third and fourth relay means located at respective first and second locations, each being responsive to reception of characteristic indication on said directional comparison circuitry to generate respective third and fourth trip command outputs to conduct during selected test actuations of said first and second program means to key trip signal transmission of a respective additional transfer trip channel.

* * * * *